Patented Aug. 17, 1943

2,326,950

UNITED STATES PATENT OFFICE 2,326,950

CHEMICAL PROCESS AND PRODUCT

Raymond J. Kepfer, Lakewood, Ohio, assignor to E. I. du Pont de Nemours & Company, Wilmington, Del., a corporation of Delaware No Drawing. Application November 29, 1940, Serial No. 367,748

10 Claims. (Cl. 210—23)

This invention relates to the treatment of hard water and is particularly directed to water softening processes in which tetrasodium pyrophosphate is dissolved in hard water and thereafter but prior to the formation of a macroscopic precipitate of the hardness an alkaline material selected from the group consisting of sodium borate, sodium metasilicate and disodium hydrogen phosphate, is dissolved in the water, and is further directed to compositions comprising tetrasodium pyrophosphate and an alkaline material of the stated group, the alkaline material being in such form as to have a dissolution rate less rapid than that of the tetrasodium pyrophosphate.

It is common practice to soften hard water and improve its suitability for detergency processes by causing an alkali to react with and precipitate the cations, such as calcium and magnesium, which are at least in part responsible for the hardness. The composition of the precipitate depends on the alkali used, sodium carbonate, for instance, precipitating insoluble carbonates of calcium and magnesium. Whatever their composition, these precipitates are undesirable in detergency processes and efforts have been made to keep them dispersed and in suspension, at least temporarily, by the action of suitable agents such as tetrasodium pyrophosphate. Tetrasodium pyrophosphate has found considerable use as a water-softening agent and detergent both alone and in combination with other alkaline materials such as trisodium phosphate, soap, and borax.

When another alkaline material is used with tetrasodium pyrophosphate in water-softening processes, the procedure has been to add the pyrophosphate and the other alkaline material to the hard water and effect their dissolution by stirring or sufficiently prolonged standing. In detergency processes employing alkaline materials together with tetrasodium pyrophosphate in hard water, the first step necessarily is to soften the water used.

Now according to this invention it is found that when tetrasodium pyrophosphate is used in hard water with certain other alkaline materials, namely sodium borate, sodium metasilicate, or disodium hydrogen phosphate, for water-softening and detergency purposes, generally improved results and a considerable reduction in the amount of the pyrophosphate consumed per unit of water softening can be accomplished by first dissolving tetrasodium pyrophosphate in the hard water and thereafter, but prior to formation of a macroscopic precipitate of the hardness, dissolving the other alkaline material in the water. It is found that this result may be accomplished either by adding the alkaline material separately shortly after the pyrophosphate has gone into solution or by adding the pyrophosphate and the other alkaline material simultaneously but in the form of compositions of such character that the rate of dissolution of the alkaline material is exceeded by that of the pyrophosphate.

The benefits of this invention will ordinarily be secured in the greatest degree when softening waters customarily referred to as "hard," that is, waters containing sixty or more parts per million, of hardness calculated as calcium carbonate, but with waters of lesser hardness advantages may also be obtained though in lesser degree.

By the use of the processes and compositions of this invention one may either effect a considerable reduction of tetrasodium pyrophosphate consumption as compared to previous practices, or for a given consumption of tetrasodium pyrophosphate may effect a substantial increase in the permanency of dispersion of hard water salts. Moreover, by using compositions of this invention, this result can be accomplished without any complications whatsoever of procedures considered to be uniform practice in the detergency and water-softening fields.

It is observed that the foregoing beneficial effects are obtained only when tetrasodium pyrophosphate is used in hard water in conjunction with certain alkaline materials. These alkaline materials will hereinafter be referred to as "supplemental alkaline materials," and it is to be understood that the supplemental alkaline material may be selected from the group consisting of sodium borate, sodium metasilicate, and disodium hydrogen phosphate.

The dissolution in hard water of tetrasodium pyrophosphate prior to a supplemental alkaline material may be accomplished in a process of this invention by adding these two agents separately. When the invention is practiced in this manner it is important that the supplemental alkaline material be added before a macroscopic precipitate of the hardness in the water has been effected by the pyrophosphate. By a macroscopic precipitate is meant a precipitate, the individual particles of which are distinguishable by the eye and which are of such a size as will rapidly settle. A cloudy suspension of particles of colloidal dimensions would not be considered as a macroscopic precipitate. Ordinarily it is desirable to add the supplemental alkaline material within a moment or two after enough pyrophosphate has dissolved to react with the hardness, although a longer lapse of time may occur provided the hardness does not form a macroscopic precipitate.

From the standpoint of simplicity of operation it is preferred to add the supplemental alkaline material and the tetrasodium pyrophosphate to hard water simultaneously, since the separate addition of calculated amounts of these agents would be bothersome to the user. By simply mixing the pyrophosphate and alkaline material according to prior art practices and adding this mixture to hard water the desirable results of this invention cannot be realized, however. Thus, when a product containing, say, nine parts by weight of sodium metasilicate and one part of tetrasodium pyrophosphate is added to hard water, both the metasilicate and pyrophosphate dissolve simultaneously. A composition of this invention, on the other hand, may employ a supplemental alkaline material and sodium pyrophosphate in such physical form that when the two are added to water as a mixture, the supplemental alkaline material dissolves more slowly than the pyrophosphate. To decrease the rate of dissolution of the supplemental alkaline material so that the pyrophosphate may first dissolve in accordance with a process of this invention, one may coat the particles of alkaline material with slowly soluble materials such as soap, gums, resins, and similar materials which will not interfere with the detergency or water-softening processes. Alternatively, one may employ a mixture of supplemental alkaline material and particles of tetrasodium pyrophosphate of such size relative to the other alkaline material that dissolution of the pyrophosphate is more rapid on account of its smaller particle size.

The processes and products of this invention may be better understood by reference to the following specific example which is given by way of illustration and not of limitation. In this example is shown an improvement in water-softening resulting from first dissolving tetrasodium pyrophosphate in hard water and then separately, but shortly thereafter, dissolving a supplemental alkaline material in the water.

*Example*

To effect softening of a water containing 300 ppm. hardness there was added a total of 0.5 per cent by weight of sodium metasilicate pentahydrate and tetrasodium pyrophosphate in the proportion of 9 parts of sodium metasilicate pentahydrate to one part of anhydrous tetrasodium pyrophosphate, the sodium metasilicate being added separately immediately after the tetrasodium pyrophosphate had completely dissolved. Dissolution of the tetrasodium pyrophosphate required about two to three minutes. A dispersion of the silicate salt of the cations responsible for the hardness of the water was obtained which was stable for thirty minutes at 60° C.

For comparison, to water of the same initial hardness there was added a total of 0.5 per cent by weight of the same proportions of sodium metasilicate and tetrasodium pyrophosphate, the two ingredients being added at the same time. The hardness of the water was caused to flocculate in five minutes and settle out by this procedure, indicating the desirability of the separate, prior addition of the pyrophosphate.

The results described above with respect to water softening are found to be substantially duplicated with respect to detergency processes employing hard water. Thus, the compositions of this invention are found not only to have maximum dispersing, suspending and deflocculating action on hard water and heavy metal salts, but also when suspending in hard water such soils, greases, and other dirts as are ordinarily encountered in washing of dishes, clothes, porcelain, milk bottles, wool, cotton, wood work, and similar objects subjected to detergent action.

The amount of tetrasodium pyrophosphate used in combination with a supplemental alkaline material may be considerably varied. For most applications the supplemental alkaline material comprises the major component and the tetrasodium pyrophosphate a minor component of a composition of this invention, but for special cases these proportions may be reversed.

While in the foregoing description of this invention there have been shown certain specific processes and compositions, it will be understood that without departing from the scope of this invention those skilled in the art may employ numerous processes and related compositions.

I claim:

1. In a process for softening hard water the steps comprising dissolving tetrasodium pyrophosphate in the water and thereafter, but prior to precipitation of the hardness, dissolving an alkaline material selected from the group consisting of sodium borate, sodium metasilicate, and disodium hydrogen phosphate in the water.

2. In a process for softening hard water the steps comprising dissolving tetrasodium pyrophosphate in the water and thereafter, but prior to precipitation of the hardness, dissolving sodium borate in the water.

3. In a process for softening hard water the steps comprising dissolving tetrasodium pyrophosphate in the water and thereafter, but prior to precipitation of the hardness, dissolving sodium metasilicate in the water.

4. In a process for softening hard water the steps comprising dissolving tetrasodium pyrophosphate in the water and thereafter, but prior to precipitation of the hardness, dissolving disodium hydrogen phosphate in the water.

5. A water-softening composition comprising tetrasodium pyrophosphate and an alkaline material selected from the group consisting of sodium borate, sodium metasilicate, and disodium hydrogen phosphate, the alkaline material being substantially in such a physical condition as to dissolve more slowly than the pyrophosphate in water.

6. A water-softening composition comprising tetrasodium pyrophosphate and sodium borate, the sodium borate being substantially in such a physical condition as to dissolve more slowly than the tetrasodium pyrophosphate in water.

7. A water-softening composition comprising tetrasodium pyrophosphate and sodium metasilicate, the sodium metasilicate being substantially in such a physical condition as to dissolve more slowly than the tetrasodium pyrophosphate in water.

8. A water-softening composition comprising tetrasodium pyrophosphate and disodium hydrogen phosphate, the disodium hydrogen phosphate being substantially in such a physical condition as to dissolve more slowly than the tetrasodium pyrophosphate in water.

9. A water-softening composition comprising tetrasodium pyrophosphate and an alkaline material selected from the group consisting of sodium borate, sodium metasilicate, and disodium hydrogen phosphate, the alkaline material being coated with a slowly water-soluble material.

10. A water-softening composition comprising tetrasodium pyrophosphate and an alkaline material selected from the group consisting of sodium borate, sodium metasilicate, and disodium hydrogen phosphate, the alkaline material being of such a size relative to the tetrasodium pyrophosphate as to have a less rapid rate of dissolution in water.

RAYMOND J. KEPFER.